United States Patent [19]

Manteufel

[11] 4,267,978
[45] May 19, 1981

[54] LIQUID DISTRIBUTION DEVICE IN LIQUID-VAPOR CONTACT APPARATUS

[76] Inventor: Rolf P. C. Manteufel, Epiceadreef 11, B-2180 Kalmthout-Heide, Belgium

[21] Appl. No.: 68,465

[22] Filed: Aug. 21, 1979

[30] Foreign Application Priority Data

Jan. 9, 1979 [BE] Belgium ................. 873352

[51] Int. Cl.³ ............................ B05B 1/36; B05B 1/20
[52] U.S. Cl. ............................... 239/193; 137/561 A; 55/241; 73/215
[58] Field of Search ....................... 239/193, 194, 450; 261/97, 98, 103, 106, 111; 55/241; 137/561 R, 561 A; 73/215, 216

[56] References Cited

U.S. PATENT DOCUMENTS

| | | | |
|---|---|---|---|
| 3,146,609 | 9/1964 | Engalitcheff, Jr. | 261/97 |
| 3,290,025 | 12/1966 | Engalitcheff, Jr. | 239/193 |
| 3,491,792 | 1/1970 | Eckert | 239/193 |

FOREIGN PATENT DOCUMENTS

| | | | |
|---|---|---|---|
| 886173 | 1/1962 | United Kingdom | 261/106 |
| 573176 | 10/1977 | U.S.S.R. | 261/97 |

*Primary Examiner*—Robert W. Saifer
*Attorney, Agent, or Firm*—Cushman, Darby & Cushman

[57] ABSTRACT

The present invention provides a device for the even distribution of liquids onto column areas which comprises distributor troughs with overflow slits and liquid guide elements, hairpin shaped guide elements having a pair of arms arranged at a distance from each other disposed in each overflow slit which is wider at the bottom and adjacent to the outside face of the trough or on lugs attached thereto, the free ends of the guide elements being led to the outside, to a level below that of the bottom of the trough.

4 Claims, 5 Drawing Figures

LIQUID DISTRIBUTION DEVICE IN LIQUID-VAPOR CONTACT APPARATUS

The present invention relates to a device for the even distribution of liquids onto column areas through trough distributors with overflow slits and liquid guide elements.

Because of the maximum area of gas passage area that is available, and the liquid drain places that are nonetheless arranged at an equal distance, trough distributors are the best-suited liquid distributors for industrial applications. However, in the case of small quantities of liquid, they do have certain disadvantages which, in the event of small overflow heights, large liquid heads occur and as a result of the manufacturing tolerances of the slits, this can lead to various drainage quantities or even to eventual blockage of partial flows.

German Pat. No. 1,084,699 describes a device for the even drainage of liquid from column plates through a dam, in which capillaries that lead from one side of the dam, across its top edge, to the other side are used as guide elements. However, as a result of the very small dimensions of the capillaries, such capillary-action distributors are only suitable for handling very small quantities of liquid, e.g., in a high-vacuum area, and are limited in the amount of liquid they can pass. Capillary elements that are very close together perform poorly as the quantity of fluid increases and the suction head thereby becomes smaller, and they are very vulnerable to fouling. In such liquid distributors, that operate on the basis of capillary action, large variations of partial flow amounts may also become apparent as a result of varying material values of the fluid, such as, for example, viscosity and surface tension. Because of the marked variations of the partial flows, distributor plates with capillary liquid feed can be used in industrial applications only in conjunction with subsequently incorporated distributor plates with drain lugs.

The present invention provides a device in which the previously described disadvantages found in familiar distributors with overflow-guide elements, that supply liquid by capillary action, have been substantially avoided, and which is characterized by a simple design that is less vulnerable to operational breakdown.

According to the present invention therefore there is provided a device for the even distribution of liquids onto column areas which comprises distributor troughs with overflow slits and liquid guide elements, hairpin shaped guide elements having a pair of arms arranged at a distance from each other disposed in each overflow slit which is wider at the bottom and adjacent to the outside face of the trough or on lugs attached thereto, the free ends of the guide elements being led to the outside, to a level below that of the bottom of the trough.

Thus in the device of the present invention hairpin-like guide elements consisting of two arms that are arranged at a distance from each other are disposed in a trough distributor having overflow slits and liquid guide elements, and are located in the overflow slits that widen out at the bottom, and are adjacent to the outside surface of the trough or to lugs attached thereto, their free ends being led to the outside, to a level below the bottom of the trough.

The present invention will be further illustrated by way of the accompanying drawings in which.

Figure 1:
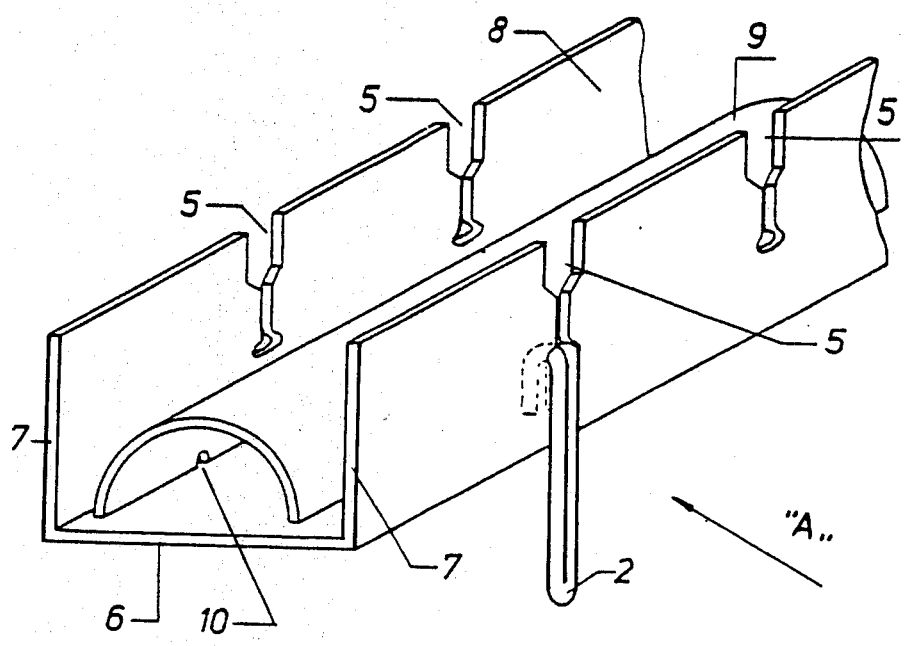
FIG. 1 is a perspective view of a portion of a device according to one embodiment of the present invention.
Figure 1A:
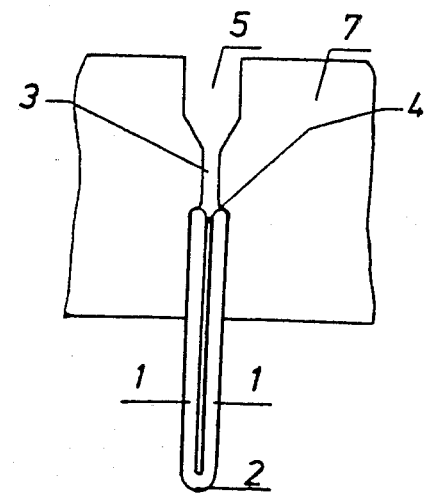
FIG. 1A is a side elevation in the direction of the arrow A of a detail of the device of FIG. 1.

Referring to the drawings the device is installed immediately above the internal column structure that is to be sprinkled. As can be seen in FIG. 1A, the two arms 1 of the guide element 2 are arranged in the slit 3 that is widened out at the bottom in such a manner that a small gap 4 is formed between them. It is desirable that the slit 3 itself is wider than the gap 4, and in addition, grows wider at the top. This ensures that the liquid distributor has a large working area. In order to avoid a liquid head forming when liquid is supplied to the individual drain places 5 the gaps 4 of the guide elements 2 are arranged at a sufficient height above the bottom 6 of the trough. The guide elements themselves lie with their two arms 1 on both sides of the dam wall 7 of the overflow trough 8 or on lugs attached thereto, and on the outside are led down to a level that is below the bottom 6 of the trough. The liquid that drains through is passed down through the two parallel arms 1 and runs off the guide elements 2 beneath the overflow trough 8.

Seen from the point of view of an acceptable horizontal orientation of the overflow trough 8 the drain places 5 must be so arranged that the head of liquid is the same at each individual drain place 5. This means that the liquid surface must not be disturbed by the liquid that is supplied to the overflow troughs 8. Neither may there be any large cross currents between the individual drain places 5, in order to avoid a pressure head (pressure gradients) between the drain places 5.

According to a particularly desirable embodiment of the device of the present invention the liquid that is supplied is passed through feed channels 9 that are located on the overflow troughs, and passed from here to the individual drain places 5 below the surface of the liquid. This ensures that the feed path between the feed channel 9 and each individual drain place 5 is of approximately the same length. It is also possible to equalize the liquid gradients that are formed as a result of the current in the feed channels 9 by means of variously sized apertures 10 in the feed channels. The feed channels 9 can be rectangular or round, in which connection the apertures 10 will be located in the lower half of the pipe.

Figure 2:
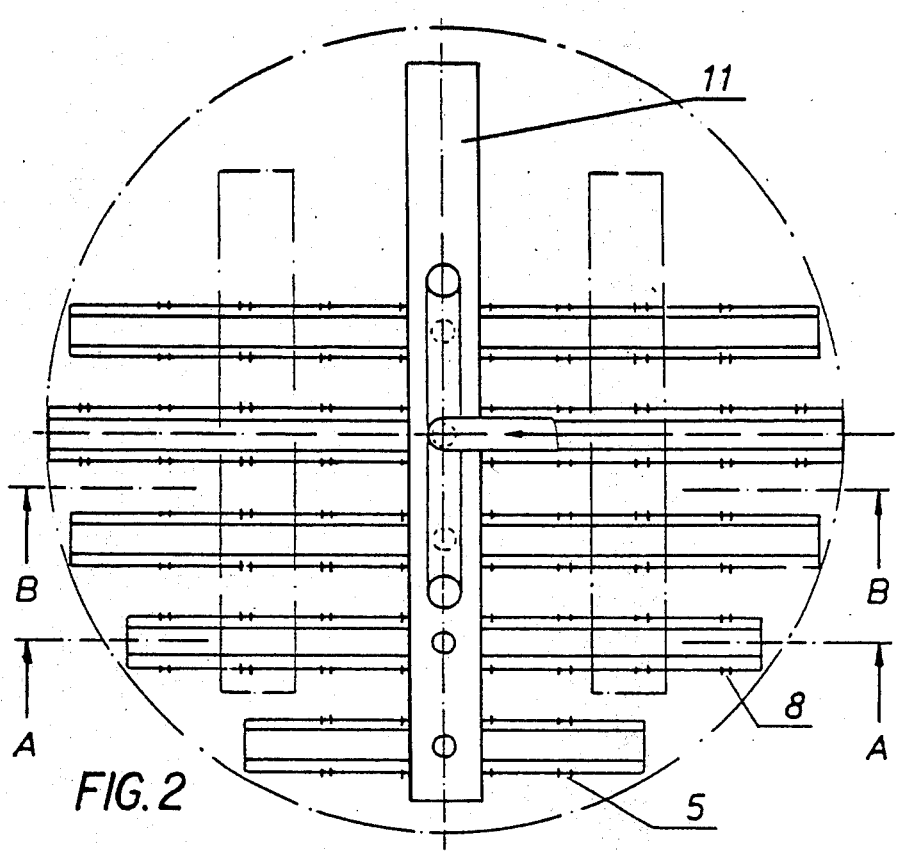
FIG. 2 is a schematic plan view of a device of the present invention in combination with a pre-distribution system.
Figure 2A:
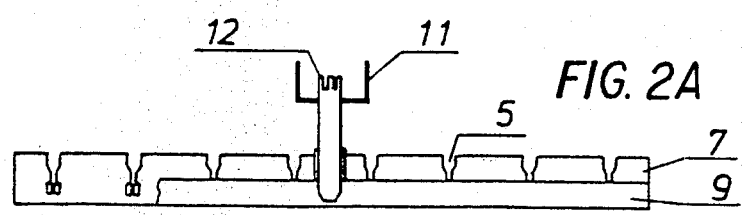
FIG. 2A is a section along the line A—A in FIG. 2.
Figure 2B:
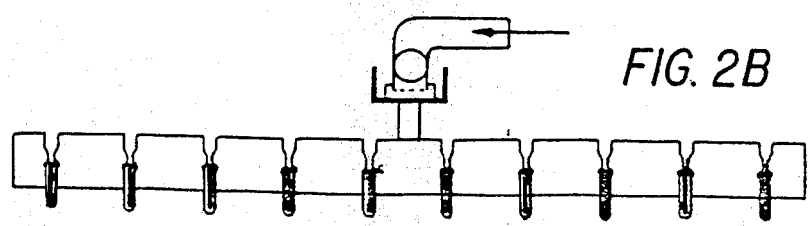
FIG. 2B is a section along the line B—B in FIG. 2.

According to a further advantageous embodiment of the device of the present invention the overflow troughs are combined with a common pre-distributor. In this connection, and referring to FIG. 2 all the overflow troughs 8 are supplied through their feed channels 9 from the common pre-distributor system 11, whereby its overflow slits 12 that are arranged at the same level are matched by the width of their slits to the number of individual drain places 5 of an overflow trough 8. The pre-distributor system can also be sealed and pressurized.

The nozzle like formation of the apertures according to the invention, unlike sharp-edged holes or slits, diverts the draining liquid over the edge of the dam, whereby the familiar, more or less large contraction of the liquid streams that are draining off attains an adhesive force that acts on the arms of the liquid guide elements, i.e. by the adhesion of the contact particles of the liquid on the solid surface of the bodies. The adhesive forces on the passage surface that is enlarged by the arms of the liquid guide elements counteract the surface tension of the liquid, and this ensures an equal response by all the drain places, resulting in more even wetting, even when only small quantities are draining and in the event of differing liquid heads.

In this connection, the two arms that are arranged at a distance from each other can be either round or rectangular. However, because of the resulting concave sides of the apertures, the round version is more effective in the case of liquids that are difficult to sprinkle. In addition, vulnerability to fouling is less in the case of the smooth surfaces of the arms of the guide elements than is the case with small, sharp-edged holes, slits and pipes in which the familiar increase in size of the holes through which the flow passes occurs because of the contraction of the stream of liquid.

The embodiments of the invention in which an exclusive property of privilege is claimed are defined as follows:

1. A device for the even distribution of liquids onto an area, said device comprising a distributor trough having vertically extending walls, overflow slits distributed along said walls and liquid guide means extending from each said slit, said liquid guide means comprising a pin-shaped pair of arms spaced from each other, each said overflow slit being wider at the top and narrower at the bottom with said liquid guide means extending from the outside face of the bottom of each said overflow slit, each said liquid guide means having a free end being disposed below the level of the bottom of the trough.

2. A device according to claim 1, in which the distance between the two arms of the liquid guide means is smaller than the width of the overflow slit.

3. The device as claimed in claim 1 in which feed channels are provided in each distributor trough, each said channel having a feed aperture therein for admitting liquid to the trough at a level below the level of said overflow slits.

4. The device as claimed in claims 1, 2 or 3, in which a common pre-distributor is provided for feeding liquid to the individual distributor troughs, said common pre-distributor having overflow slits disposed at the same level and each having a width which is proportional to the number of overflow slits of an associated distributor trough.

* * * * *